United States Patent [19]

Chevalier et al.

[11] Patent Number: 5,002,709

[45] Date of Patent: Mar. 26, 1991

[54] METHOD OF MAKING A FOAM INSULATED VESSEL

[75] Inventors: James L. Chevalier, Mequon; John D. Pfeffer, Brookfield; Thomas F. Brownell, Oconomowoc, all of Wis.

[73] Assignee: A. O. Smith Corporation, Milwaukee, Wis.

[21] Appl. No.: 383,912

[22] Filed: Jul. 21, 1989

Related U.S. Application Data

[63] Continuation-in-part of Ser. No. 156,956, Feb. 18, 1988, abandoned.

[51] Int. Cl.⁵ ............................................. B29C 67/22
[52] U.S. Cl. ................................. 264/46.5; 264/46.6; 264/46.9; 264/55
[58] Field of Search ............ 264/46.5, 46.6, 46.7, 264/46.9, 55, 50, 45.1

[56] References Cited

U.S. PATENT DOCUMENTS

| | | |
|---|---|---|
| 2,947,307 | 8/1960 | Hoppe . |
| 3,878,686 | 4/1975 | Hageman et al. ................. 264/46.6 |
| 4,372,028 | 2/1983 | Clark et al. ........................... 29/460 |
| 4,477,399 | 10/1984 | Tilton ................................. 264/45.2 |
| 4,628,184 | 12/1986 | West ................................... 264/46.7 |
| 4,861,968 | 8/1989 | West ................................... 264/46.9 |
| 4,878,482 | 11/1989 | Pfeffer ................................ 264/46.9 |
| 4,898,630 | 2/1990 | Kitoh et al. ............................. 156/79 |

Primary Examiner—Robert A. Dawson
Assistant Examiner—Allan R. Kuhns
Attorney, Agent, or Firm—Andrus, Sceales, Starke & Sawall

[57] ABSTRACT

A method of producing a foam insulated vessel, such as a water heater. The water heater includes a tank to contain water to be heated and a jacket is spaced outwardly of the tank to provide a cavity therebetween. A band of self-supporting, gas entrained, foamable resin is applied to either the outer surface of the lower end portion of the tank, or to the inner surface of the jacket. The band of foamable resin expands radially to form a closure or dam that divides the cavity into a pair of isolated spaces. A liquid foamable resin composition is then introduced into one of the spaces and expands to fill the space and provide an insulating layer between the tank and the jacket.

12 Claims, 2 Drawing Sheets

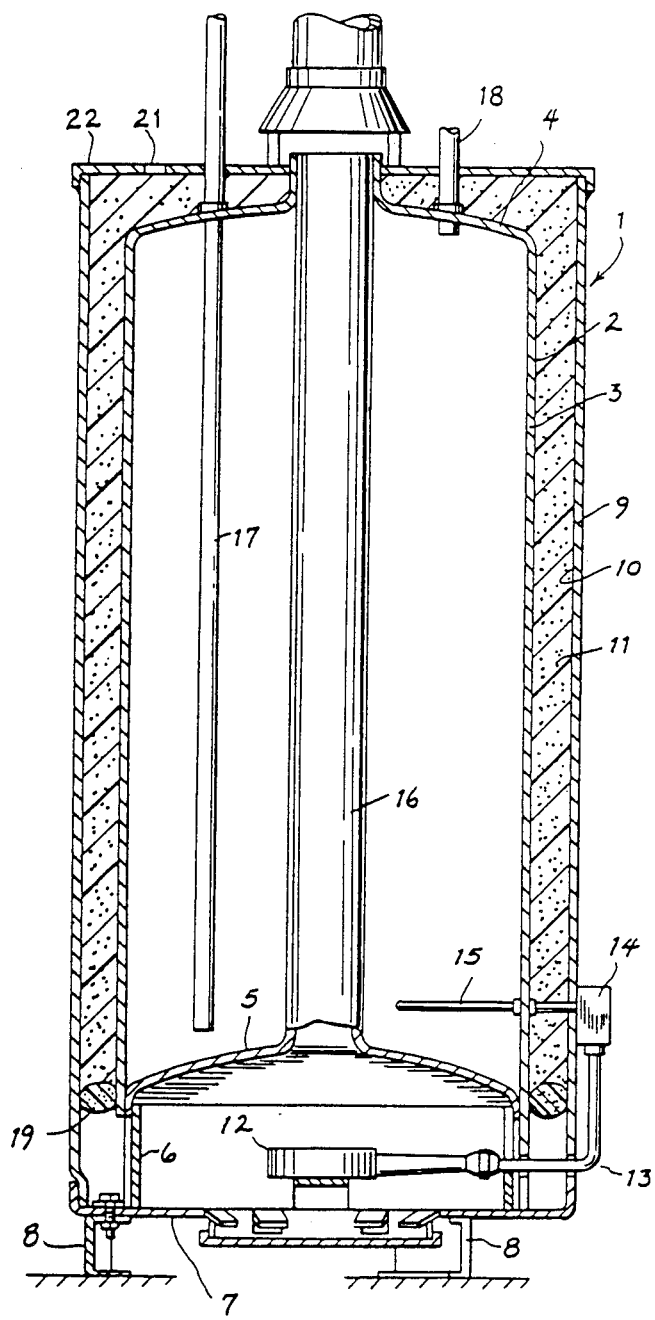
FIG. 1.
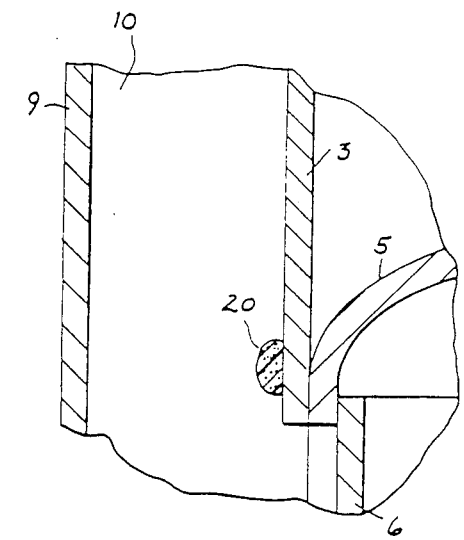
FIG. 2.
FIG. 3.

METHOD OF MAKING A FOAM INSULATED VESSEL

RELATED APPLICATION

This application is a continuation-in-part of application Ser. No. 07/156,956, filed Feb. 18, 1988, now abandoned.

BACKGROUND OF THE INVENTION

The typical water heater includes a tank to contain water to be heated and a jacket is spaced outwardly of the tank to provide an annular cavity therebetween. To insulate the tank, a layer of insulating material, which can take the form of fiber glass or a foam resin material, such as polyurethane foam, is located in the cavity.

When insulating a tank with a foamed resin composition, a liquid resin is introduced into the upper end of the cavity and expands outwardly to fill the cavity and provide an insulating layer. In one method of providing the foamed insulated water heater, as disclosed in U.S. Pat. No. 4,628,184, a bag formed of polyethylene film and having a closed bottom is disposed within the cavity and the liquid resin is introduced into the bag. With this method, the bag contains the liquid resin and prevents the liquid from leaking from the cavity.

In other methods of producing a foam insulated water heater, a dam or closure is positioned at the lower end of the cavity to retain the liquid resin, as it is introduced into the cavity. In accordance with the method of U.S. Pat. No. 4,477,399 an inflatable annular ring is located at the lower end of the cavity, and by introducing gas into the ring, the ring will extend radially to form a dam or closure at the lower end of the cavity. In U.S. Pat. No. 4,372,028, an annular bag is positioned at the lower end of the cavity and the bag is filled with a liquid foamable resin composition. The resin expands outwardly within the bag to provide a collar or dam at the lower end of the cavity.

The use of an inflatable bag is a relatively expensive procedure, particularly if the bag is not removed and is retained in the fully assembled water heater. On the other hand, removal of the bag for reuse is difficult, even if release agents are utilized, because of the tendency of the liquid resin composition to bond firmly to areas that are not adequately coated with the release agent.

It has also been proposed to seal or close off the lower end of the cavity between the tank and the jacket through use of a fiber glass ring. However, a fiber glass ring, if not properly installed, may not provide a positive seal and the pressure of the expanding resin within the cavity may cause the fiber glass ring to shift or migrate during the foaming operation.

SUMMARY OF THE INVENTION

The invention is directed to a method of producing a foam insulated vessel, such as a water heater. A jacket is spaced outwardly of the water heater tank and a band of a self-supporting, gas-entrained foamable resin composition is applied to the outer surface of the tank, or alternately to the inner surface of the jacket. The band of the foamable resin composition will expand radially across the cavity to form a closure or dam in the cavity. A liquid foamable resin composition is then introduced into the upper end of the cavity and the dam serves to contain the liquid resin. The liquid resin composition expands to fill the cavity and provide an insulating layer between the jacket and the tank.

In a preferred form of the invention, as used in commercial production, the water heater is mounted for rotation on a suitable turntable and the self-supporting, gas entrained, resin composition is sprayed through a mixing head onto the outer surface of the rotating tank to form a circular band. The outer jacket is then placed around the tank and the band of self-supporting resin expands outwardly into contact with the jacket to form an annular dam.

The liquid foamable resin composition is then introduced into the upper end of the cavity between the tank and the jacket and expands to fill the cavity to provide the insulating layer between the tank and the jacket.

The use of the self-supporting, gas-entrained foamable resin composition provides a simple and inexpensive manner of obtaining a dam or closure at the lower end of the cavity.

As the resin composition of the band bonds firmly to both the tank and the jacket, a positive seal results without any possibility of migration or displacement of the dam during the foaming operation.

The band of the foamable resin composition can be applied to either the jacket or the tank and may be positioned anywhere along the length of the tank, depending upon the tank construction. The dam-forming band can be utilized with either gas-fired or electric water heaters, or any other type of insulated vessel.

Other objects and advantages will appear in the course of the following description.

DESCRIPTION OF THE DRAWINGS

The drawings illustrate the best mode presently contemplated of carrying out the invention.

In the drawings:

FIG. 1 is a longitudinal section of a typical water heater incorporating the invention;

FIG. 2 is an enlarged fragmentary longitudinal section showing the application of a band of self-supporting foamable resin composition of the tank;

FIG. 3 is a view similar to FIG. 2 showing the resin band after expansion to form a dam.

DESCRIPTION OF THE ILLUSTRATED EMBODIMENT

Figure 4:
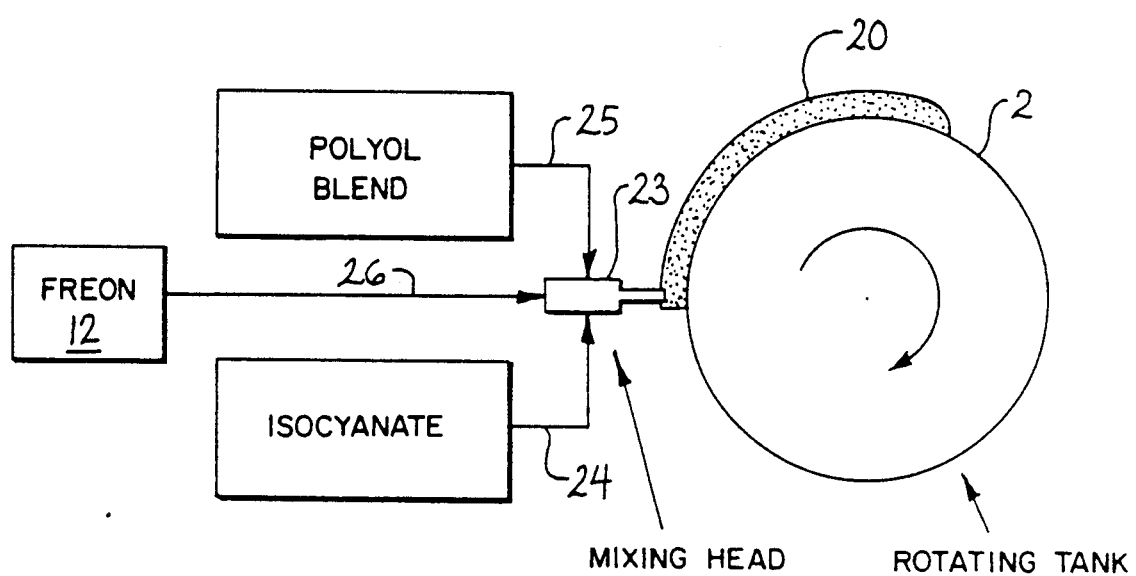
FIG. 4 is a schematic view of the manner of applying a band of self-supporting gas-entrained foamable resin composition to the outer surface of a water heater tank.

FIG. 1 illustrates a typical gas-fired water heater 1 that includes a steel tank 2 to contain water to be heated. Tank 2 includes a generally cylindrical shell 3, which is enclosed at its upper end by an upper head 4 and at its lower end by a lower head 5.

Skirt 6 extends downwardly from the lower end of the tank and supports the tank above base 7 which, in turn, is supported from the ground, or other foundation, by a plurality of legs 8.

Surrounding tank 2 is a cylindrical jacket 9 and the jacket is spaced outwardly of the tank to provide an annular space or cavity 10 therebetween, which, in the completed state of the water heater, contains a foam resin insulating material 11.

Water within tank 2 is heated by a burner 12, which is located beneath lower head 5, and a gas fuel is fed to the burner through a supply line 13. The flow of the gas through line 13 is controlled by a conventional control valve 14 which, in turn, is operated by a thermostat 15 that is responsive to the water temperature.

The waste gases of combustion generated by ignition of the fuel-air mixture are conducted upwardly through the tank through one or more vertical flues 16. As illustrated, the lower end of flue 16 is secured within an opening in lower head 5, while the upper end of the flue is secured within an aligned opening in upper head 4. A suitable baffling arrangement, nor shown, can be incorporated with the flue 16 to increase the heat transfer form the waste gases of combustion to the water in tank 2.

The inner surface of tank 2, as well as the outer surface of flue 16 can be coated with a conventional corrosion resistant coating, not shown, such as glass or vitreous enamel.

Water is introduced into the lower end of tank 2 through a dip tube 17 and heated water is withdrawn from the upper end of the tank through an outlet 8.

The foam resin composition 11, which fills cavity 10, preferably takes the form of a polyurethane foam produced by the reation of an isocyanate and a polyol. In practice, a polyol blend is prepared consisting of a polyol, a blowing agent, preferably a vaporizable fluorocarbon liquid, such as that sold under the tradename "Freon 11" by E. I. DuPont de Nemours, a surfactant and a catalyst. The polyol blend is then is mixed with an isocyanate in a mixing head and the mixture is introduced into cavity 10. A reaction occurs between the polyol and isocyanate which is exothermic and generates heat, thereby heating the Freon 11 to a temperature above its boiling point to vaporize the Freon 11. The bulk of the vapor or gas is entrained in the foam to provide a closed cell foam structure, which serves as the insulating layer 11.

In accordance with the invention, an annular closure or seal 19 is provided at the lower end of the cavity 10 and serves as a dam to retain the liquid foamable resin as it is introduced into the cavity. To form closure 19, a band or bead 20 of a self-supporting supporting, gas-entrained foamable resin composition is applied to the outer surface of shell 3, as shown in FIG. 3, and the band extends completely around the periphery of the shell.

The resin composition of band 20 is different in physical characteristics from that of the liquid resin composition which is employed to fill cavity 10, in that the resin composition of band 20 contains entrained gas, separate from gas generated by the reaction of the resin components, so that the resin composition is frothy and self-supporting. This enables the band 20 to be applied to the tank shell 3 without sagging or dripping. Further, the rate of reaction and gas generation of the resin composition can be delayed, by the type and amount of catalyst used, so that there is no appreciable expansion of the band 20 for a period of about 10 to 20 seconds. This delay in expansion enables the jacket 9 to be positioned around the tank after application of band 20 to the outer surface of the tank.

The self-supporting frothy foam used to provide band 20 differs in formulation from the liquid resin used as the insulating layer 11. The conventional liquid polyurethane resin utilized to form the insulating layer 11 has a relatively thin consistency which would readily drip from the tank or jacket before the foaming reaction began, so that no dam could be produced.

The resin composition utilized for forming band 20 includes a polyol, a blowing agent, such as Freon 11, a surfactant and a catalyst, and this polyol blend is mixed with the isocyanate in a mixing head. In addition, a volatile liquid, such as Freon 12, which is capable of vaporizing at ambient temperatures is also injected into the mixing head. The Freon 12 will vaporize immediately on introduction into the mixing head to provide a gas entrained, frothy, self-supporting mass, which is discharged from the head to form band 20.

Following application of the band 20 to the tank or jacket, the isocyanate in the resin composition will react with the polyol and the exothermic reaction will generate heat to vaporize the Freon 11, causing full expansion of the resin composition and expanding the resin mass or band 20 outwardly to bridge the cavity between the tank and jacket and form the dam.

The resin composition used in forming the dam can have the following formulation in weight percent:

| Polyol | 26%–50% |
|---|---|
| Isocyanate | 26%–50% |
| Freon 11 | 7%–15% |
| Catalyst and sufactant | 1%–5% |
| Freon 12 | 4%–12% |

As previously noted, the amount and type of catalyst in the polyurethane system will control the amount of delay of expansion of the band 20. If the band 20 is applied to the outer surface of tank 2 before the jacket 9 is placed around the tank, a short delay in expansion is desirable, in the neighborhood of 10 to 20 seconds to permit assembly of the jacket around the tank. On the other hand, if the band 20 is applied to the outer surface of the tank 2 after assembly of the jacket 9, a delay in expansion is not important to the procedure.

After the resin composition of band 20 has expanded radially to seal or enclose the lower end of cavity 9, as shown in FIG. 3, a conventional liquid foamable resin composition is introduced into the upper end of cavity 9 through an opening 21 in the jacket cover 22. The resin composition will expand within cavity 10 to fill the cavity and provide the insulating layer 11 that fills the cavity and is securely bonded to both the jacket 9 and tank 2, as well as to dam 19.

While the above description has shown the band 20 being applied to the outer surface of tank 2, it is apparent that the band could alternately be applied to the inner surface of jacket 9 in a similar manner, with the resin then expanding inwardly into contact with the outer surface of the tank. Similarly, band 20 could be applied to both the outer surface of the tank and the inner surface of the jacket, if desired.

The expanded band or dam 19, as shown in FIG., 3, is bonded firmly to both the tank and jacket to provide a positive seal or dam to retain the liquid resin which is introduced into cavity 10. As the dam is firmly bonded to the members, there will be no migration or displacement of the dam during the foaming operation.

FIG. 4 illustrates schematically the manner of applying the self-supporting, gas-entrained band 20 to the outer surface of a water heater tank in commercial practice. As shown in FIG. 4, tank 2 is supported on a suitable turntable or other rotatable support and a mixing head 23 is located adjacent the outer surface of the tank at a level slightly above the bottom of the tank. An isocyanate is introduced through line 24 to head 23, while the polyol blend is introduced to the head through line 25. In addition, a liquid which is vaporizable at ambient temperatures, such as Freon 12, is introduced to head 23 through line 26.

As the tank is rotated, a frothy self-entrained mass of foam will be sprayed from the head on the rotating tank in the form of band 20. As previously described, by selection of a proper catalyst the reaction between the polyol and isocyanate can be delayed, generally for a period of 10 to 20 seconds, to permit the jacket to be assembled around the tank after the band has been applied to the entire periphery of the tank.

While FIG. 4 shows the tank as being rotated, it is contemplated that the tank can be stationary and the mixing head can be rotated around the periphery of the tank to provide the band 20 of self-supporting foam.

While the above description has illustrated the formation of a dam at the lower end of a water heater tank, it is contemplated that the invention can also be used to form isolated areas which surround outlets, fittings, or other connections in the wall of the tank, thereby preventing the liquid foam insulation material from contacting these isolated areas. For example, electric water heaters include a heating element and thermostat which are mounted through fittings to the wall of the tank. The gas entrained resin can be applied around the fittings in the form of a small circular band, and on expansion of the band into contact with the jacket, an access opening or passage is formed which extends radially of the cavity 10.

While the above description has shown the invention as applied to a gas-fired water heater, it is contemplated that the invention can be applied to an electric water heater or to any foam insulated vessel.

Various modes of carrying out the invention are contemplated as being within the scope of the following claims particularly pointing out and distinctly claiming the subject matter which is regarded as the invention.

We claim:

1. A method of producing a foam insulated vessel, comprising the steps of providing a tank member and an outer jacket member that is adapted to be spaced around the tank member to provide an annular cavity therebetween, formulating a first resin composition containing reactable components and containing a first liquid capable of vaporizing at ambient temperature and containing a second liquid capable of vaporizing at an elevated temperature higher than ambient temperature, applying a mass of said first resin composition directly to a first of said members, vaporizing said first liquid on application of said composition to said first member to provide a frothy self-supporting mass, subsequently reacting said components to generate heat and cause vaporization of said second liquid to expand said mass into contact with said second of said members and provide a dam bridging the cavity, introducing a second liquid foamable resin composition into said cavity and into contact with said dam, and expanding second resin composition in said cavity to provide an insulating layer between said members.

2. The method of claim 1, wherein said mass is applied to the outer surface of said tank member.

3. The method of claim 2, wherein said mass extends in the form of a band around the entire periphery of said tank member.

4. The method of claim 1, wherein said mass is applied to the inner surface of said jacket member.

5. The method of claim 1, wherein said first resin composition is polyurethane.

6. The method of claim 3, wherein said mass is applied to the lower end of said tank member and said second liquid resin composition is introduced into the upper end of said cavity above said dam.

7. The method of claim 1, wherein said mass is applied to said first member before said members are assembled.

8. The method of claim 1, wherein said mass is applied to said first member after said members are assembled.

9. A method of producing a foam insulated vessel, comprising the steps of providing a tank member and an outer jacket member that is adapted to be spaced around the tank member to provide an annular cavity therebetween, formulating a foamable first resin composition containing reactable components and containing a first liquid capable of vaporizing at ambient temperature and containing a second liquid capable of vaporizing at an elevated temperature higher than said ambient temperature, applying a mass of said first resin composition at ambient temperature directly to a first of said members to vaporize said first liquid and provide a frothy self-supporting mass, effecting a rise in temperature of said first resin composition to said elevated temperature to thereby vaporize said second liquid and expand said first resin composition radially into engagement with said second member to bridge said cavity and provide a dam, introducing a second liquid foamable resin composition different in formulation from said first composition into said cavity and into direct contact with said dam, and expanding said second liquid resin composition to fill the cavity and provide an insulating layer between said tank member and said jacket member.

10. The method of claim 9, wherein the step of applying said mass comprises spraying said composition through a mixing head onto said first member.

11. The method of claim 10, wherein the step of spraying said mass comprises spraying said mass onto the outer surface of said tank member.

12. The method of claim 11, and including the step of providing relative rotation between said tank member and said mixing head to thereby apply said mass around the complete periphery of said tank member.

* * * * *